United States Patent
Wilcox et al.

(10) Patent No.: US 6,382,982 B1
(45) Date of Patent: May 7, 2002

(54) EDUCATIONAL TOOL COMPRISED OF SELECTABLE OPTICALLY-LINKED MODULES

(76) Inventors: Russell B. Wilcox, 7979 1/2 Ter., El Ceritto, CA (US) 94530; Patricia C. Payne; Stephen A. Payne, both of 3090 Massachusetts St., Castro Valley, CA (US) 94546; Steven T. Mills, 3921 Edgemoor Pl., Oakland, CA (US) 94605; Karen L. Jentes, 1158 Meridith Ave., San Jose, CA (US) 95125

( * ) Notice: Subject to any disclaimer, the term of this patent is extended or adjusted under 35 U.S.C. 154(b) by 0 days.

(21) Appl. No.: 09/569,161

(22) Filed: May 11, 2000

(51) Int. Cl.[7] ............................................. G09B 23/22
(52) U.S. Cl. ...................................... 434/303; 434/300
(58) Field of Search ................................. 434/300, 303; 350/449, 167, 206, 245, 271; 446/102, 103

(56) References Cited

U.S. PATENT DOCUMENTS

| | | | | |
|---|---|---|---|---|
| 3,370,362 A | * | 2/1968 | Dodson | 434/300 |
| 3,932,949 A | * | 1/1976 | King | 434/303 |
| 4,860,475 A | | 8/1989 | Levy et al. | 40/547 |
| 5,009,602 A | * | 4/1991 | Chandler | 434/300 |
| 6,252,241 B1 | * | 6/2001 | Sarussi | 250/559.4 |

OTHER PUBLICATIONS

Pasco Product Catalog 2000 pp. 152–153, Printed in USA.
Daedalon Experiments & Apparatus Catalog 2000–2001 pp. 55–57, No Publisher or Country given.
Phywe Catalog, No Date given. pp. 14 & 15. No Publisher or Country given.
Hearlihy & Company Technology Education Catalog 2000 pp. 38039, No Publisher or Country given.

* cited by examiner

Primary Examiner—Kien T. Nguyen
(74) Attorney, Agent, or Firm—John P. Wooldridge

(57) ABSTRACT

The invention is a teaching tool, intended to elucidate the principles of light and its associated technologies. For several of the embodiments, the optics and components are embedded into sliding or rotating structures, so that the student is able to "shift" or "dial" the component into a pre-determined location within the optical train in order to perform the intended optical demonstrations. The invention may contain diode lasers, light-emitting diodes, light bulbs, lenses, modulators, holograms, prisms, interferometers, polarizers, slits, apertures, detectors, and fiber optics. Because the optics are readily selectable within the optical train, a large variety of different demonstrations can be conveniently performed. Another type of architecture is to employ linkable modules, each containing one or more components, which can be linked together in a variety of permutations in order to perform many different demonstrations.

16 Claims, 3 Drawing Sheets

EDUCATIONAL TOOL COMPRISED OF SELECTABLE OPTICALLY-LINKED MODULES

BACKGROUND OF THE INVENTION

1. Field of the Invention

The present invention relates to the study of the principles of light, and more specifically, it relates to a device having pre-assembled and selectively alignable optical, mechanical and electrical components usable as an aid in the study of optical principles.

2. Description of Related Art

There has been a great deal of academic research to improve students' conceptual understanding of physics through the use of hands-on learning methods. Priscilla W. Laws and the Activity-Based Group from Dickinson College developed three activity-based introductory physics curricula called Workshop Physics, Tools for Scientific Thinking, and RealTime Physics. These activity-based methods help teachers and their students learn physics. Paul D'Alessandris from Monroe Community College in Rochester, N.Y. developed the curriculum program "SPIRAL Physics Active Learning Workbook" to improve students' conceptual understanding of physics and problem-solving ability. Lillian C. McDermott and the Physics Education Group from the University of Washington investigated student difficulties in learning geometrical optics and the wave model [see L. C. McDermott and the Physics Education Group at the University of Washington, *Physics by Inquiry*, (Wiley, N.Y., 1996) Vols. I and II]. The Physics Education Group developed Physics by Inquiry, an inquiry-based curricula for introductory physics. Gareth T. Williams from San Jose State University developed the Lase Project (Laser Applications in Science Education) to provide hands-on workshop for physics teachers using He—Ne lasers to study optics and applications of lasers. These teaching methods rely on hands-on activities to demonstrate the various principles.

The existing methods for teaching the principles of light, by way of its detection and manipulation, involve the arranging, aligning and assembling of multiple components to perform each learning exercise. Typically, the student will use optics kits, which contain the various components such as lenses, holders, prisms, a light bulb or laser diode source, etc. Companies that sell these kits include Laser LightLab Inc. (San Jose, Calif.), PASCO Scientific (Roseville, Calif.), Metrologic Instruments (Blackwood, N.J.), and Edmund Scientific Company (Barrington, N.J.). In all of the known cases, the student must assemble the kit's components together prior to conducting the demonstration or experiment. It is desirable that an approach would be provided which would eliminate nearly all of the set-up time to save time for teachers and students in the classroom and reduce their frustration in locating components. It is also desirable that such approach would allow students to concentrate on the physics issues, rather than on the details of the mechanical assembly.

The subject invention is based on employing a mechanism to selectively introduce optics or other components into the optical train at pre-determined locations. This approach of rotating an optical component into an optical train is used in other inventions. For example, the laboratory microscope contains three or more objective lenses mounted on a rotating stage. Images are observed at different magnifications as each lens is rotated into place. A carousel projector is a revolving tray from which slides are fed one at a time into the projector. A toy viewer shows the user images of objects, by rotating the images on the circular disc into view. During eye exams, an optometrist uses an optimeter instrument to determine error in the refractive power of the patient's eye. The optometrist rotates the corrective lenses within the optimeter to evaluate the patient's vision. The subject invention similarly relies on the use of selectable optical modules, where the component can be switched to pre-determined location in the optical train.

SUMMARY OF THE INVENTION

It is an object of the present invention to provide an improved demonstration tool for teaching the physics of light.

It is another object of the invention to provide a easy-to-use, teaching tool, for the purpose of elucidating the principles of light and its associated technologies.

All of the optics and components can be embedded into sliding or rotating structures, so that the student is able to "shift" or "dial" the component into a pre-determined location within the optical train in order to perform the intended optical demonstrations. The invention may contain diode lasers, light-emitting diodes, light bulbs, lenses, modulators, holograms, prisms, interferometers, polarizers, slits, apertures, detectors, and fiber optics. Because the optics are readily selectable within the optical train, a large variety of different demonstrations can be conveniently performed. A second type of disclosed architecture employs linkable modules, each containing one or more components which can be linked together in a variety of permutations in order to perform many different demonstrations.

DETAILED DESCRIPTION OF THE INVENTION

The invention is learning system comprised of modules that link together into pre-determined locations. Each of the modules illustrates a principle of optics or optical technology, and more complex principles can be demonstrated by linking several of the modules together and transferring the light beam, by virtue of the proximity of the modules. A critical aspect of the invention is that the specific components are mechanically ordained to link together in specific arrangements. Due to this feature, the educational tool becomes much easier to use by the students and teachers, as nearly no assembly or optical alignment is necessary. As a consequence, the learning system is much more amenable for use in the classroom, since the tedium of assembly and alignment is essentially eliminated. Teachers will have much more time to explain the principles of optics and associated technologies to their students, rather than expending the classroom time searching for lost parts, dealing with assembly instructions, and worrying about damage to fragile parts.

As required, detailed embodiments of the present invention are disclosed herein. However, it is to be understood that the disclosed embodiments are merely exemplary of the present invention which may be embodied in various systems. Therefore, specific details disclosed herein are not to be interpreted as limiting but rather as a basis for the claims and as a representative basis for teaching one skilled in the art to variously practice the present invention.

Figure 1:
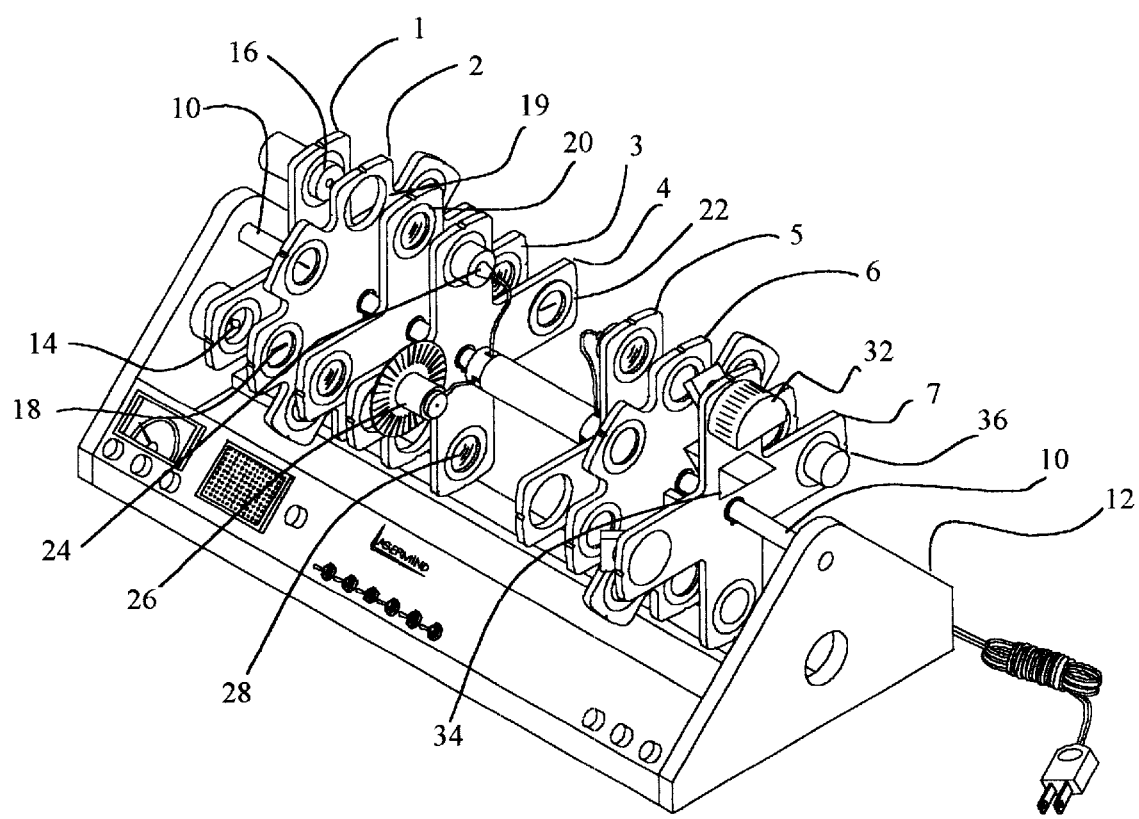
FIG. 1 displays an embodiment of the invention having components imbedded into rotating structures that can be dialed into the optical train at the uppermost aperture to perform various optical demonstrations.

FIG. 1 shows an illustration of the invention having components embedded into or fixedly attached onto precision rotating structures, where it is possible to simply dial-in the desired optic or component. For the embodiment shown in FIG. 1, up to eight different components are imbedded into each rotatable structure. As shown in the figure, this embodiment includes rotating wheels 1–7, where each rotating wheel includes a variety of optical elements and, in some cases, an opening or aperture to allow light to pass unaffected. Each wheel is rotatably mounted on a common axis of rotation 10 and may include a desired number of optical elements exceeding the number of elements shown in the figure. The axis 10 is rotatably connected at each end to a base unit 12. Rotating wheel 1 includes a light bulb 14 and a laser diode 16. The wheel may also include a variety of other light sources, including a number of LEDs, where preferably each LED would emit at wavelengths that are different from that of other mounted LEDs. A fiber optic (not shown) may be mounted onto wheel 1 to inject a remote light source into the system. By mounting a fiber optic (not shown) onto one of the wheels 2–7 (preferably wheel 7), where such fiber optic is operatively positioned to receive light from the light source on wheel 1 (preferably from the input fiber), multiple modules may be linked together. Such linking of modules may have industrial and research utility as well as the education utility described herein.

Referring again to FIG. 1, wheel 2 is shown to include a slit 18 and an opening 19; however, this wheel may include other desired optical elements, including a double slit, a picture, a grating, a polarizer and/or an aperture (all not shown in the figure). Wheel 3 is shown to include a lens 20, which may be a desired type of lens (e.g., a positive or negative refractive or diffrative lens). Wheel 3 may also have one or more openings. Wheel 4 is shown to include an opening 22, a fiber optic 24, a chopper 26 and a birefringent crystal 28. It may be convenient to include an acousto-optic modulator or other components on wheel 4. Wheel 5 is shown to include the output end of fiber optic 24. The axis of rotation is shown to include a cylindrical housing 30 which provides a covering for fiber optic 24 as it passes between wheel 4 and wheel 5. The cabling for the chopper 26 may also be neatly concealed and protected within cylindrical housing 30. Wheel 5 also may conveniently mount a screen, a polarizer, a bandpass filter, a neutral density filter, an etalon, an opening and/or other optical components.

Wheel 6 may include a screen, a polarizer, a filter, an etalon, an opening and/or other optical components. Wheel 7 is shown to include a protractor 32 for demonstration of Snell's Law, and further includes a prism 34, a detector 36. Wheel 7 may also include other optical components such as an interferometer or a mirror.

The user of the device can elect to follow instructions which suggest the particular component to dial-in to the optical train (i.e., into the light path) for each of the seven wheels illustrated. Table 1 below provides examples of the type of experiments that can be performed with this embodiment of the invention. The demonstration exercises noted in Table 1 are not intended to be limiting, but are intended to give a sense of the many opportunities to learn about the principles of light and its manipulation by use of the present invention.

TABLE 1

Examples of demonstration exercises that can be performed with the device similar to that in Figure 1.

| Demonstration | Wheel Number | | | | | | |
| --- | --- | --- | --- | --- | --- | --- | --- |
|  | 1 | 2 | 3 | 4 | 5 | 6 | 7 |
| Magnification of image | Bulb | Picture | Lens | Open | Lens | Screen | — |
| Diffraction, color-dispersion | Bulb | Grating | Lens | Open | Open | Screen | Unused |
| Polarization | Bulb | Polarizer | Open | Open | Open | Polarizer 2 | Detector |
| Measure separated colors | Bulb | Grating | Lens | Open | Open | Filter | Detector |
| Fiber optic - incoherent light | LED | Open | Lens | Fiber | Fiber | Screen | Unused |
| Fiber optic - coherent light | Laser | Open | Lens | Fiber | Fiber | Screen | Unused |
| Interference | Laser | Open | Lens | Open | Lens | Open | Interfer. |
| Young's experiment | Laser | Double slit | Lens | Open | Open | Screen | — |
| Amplitude modulation | Laser | Open | Lens | Chopper | Lens | Open | Detector |
| Snell's law | Laser | Open | Open | Open | Open | Open | Snell's law |
| Reflection | Laser | Open | Open | Open | Open | Open | Mirror |
| Loss of coherence | Laser | Open | Lens | Fiber | Fiber | Open | Interfer. |
| Birefringence | LED | Polarizer | Lens | Birefring. | Open | Polarizer | Detector |
| Fabry-Perot | Laser | Open | Lens | Open | Lens | Etalon | — |
| Airy spots | Laser | Aperture | Lens | Open | Open | Screen | — |
| Voice modulation | Laser | Open | Lens | Modulator | Lens | Open | Detector |
| Scrambling of image | LED | Picture | Lens | Fiber | Fiber | Screen | — |

Additional Embodiments

Figure 2:
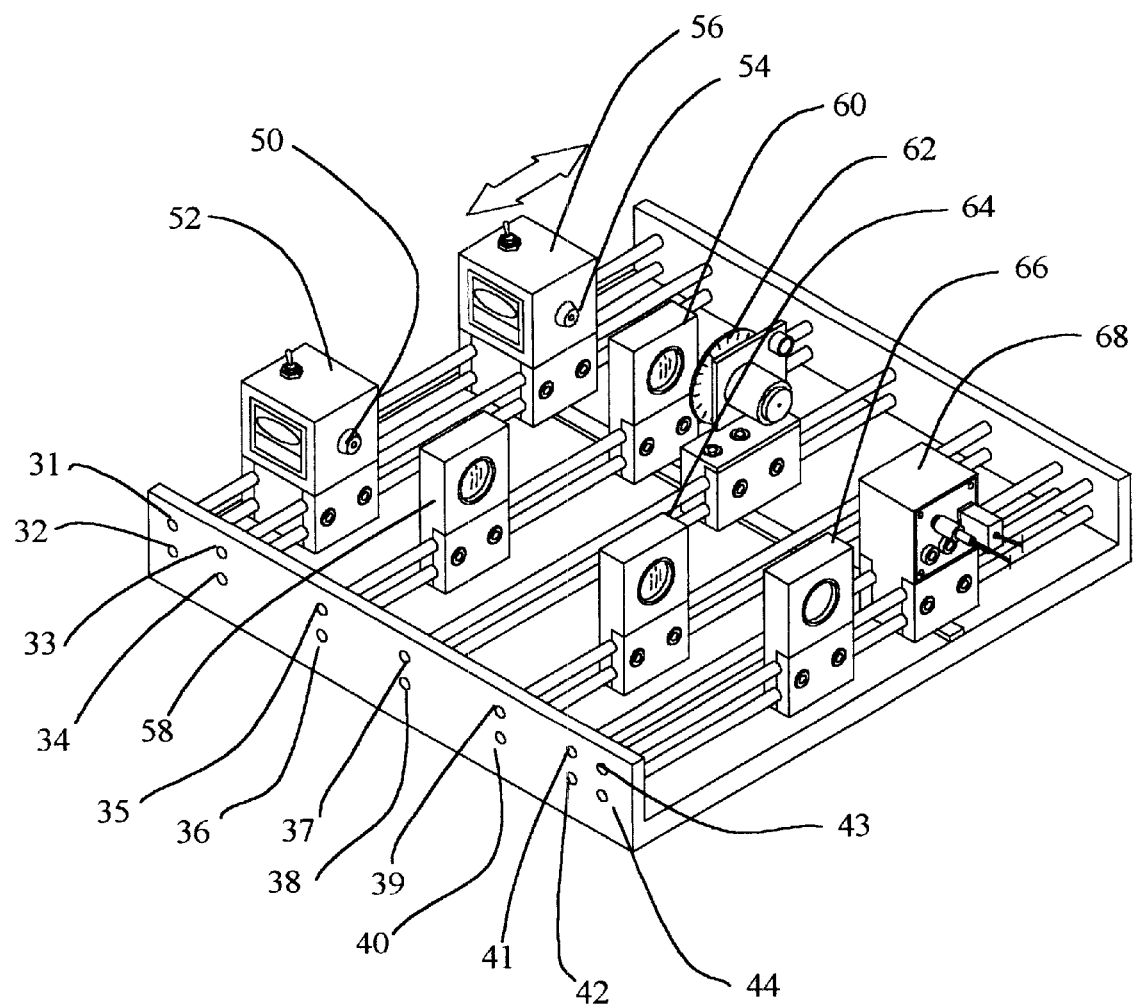
FIG. 2 illustrates a second embodiment of the invention where it is possible to slide the components into the optical train in order to select the various optical arrangements and perform optical demonstrations.

FIG. 2 illustrates a second means of permitting the mechanical insertion of optics into pre-determined locations. In this embodiment the components occur on sliding, rather than rotating structures. This embodiment comprises rails 31–44. Each component in this system is mounted with at least two rails for stability. Some of the individual components are mounted with four rails for added stability. Light bulb 50 in housing 52 with an internal power supply (battery) and laser diode 54 and housing 56 are both mounted onto rails 31–34. Lenses 58 and 60 are mounted onto rails 35 and 36. Chopper 62 is mounted onto rails 37 and 38. Another lens 64 may be mounted onto rails 40 and 41. A screen 66 and a detector 68 are mounted onto rails 41–44. This embodiment can be configured to include a system of rails adequate to perform the same operations as the system shown in FIG. 1 where the components are introduced into the optical train by the user.

Figure 3A:
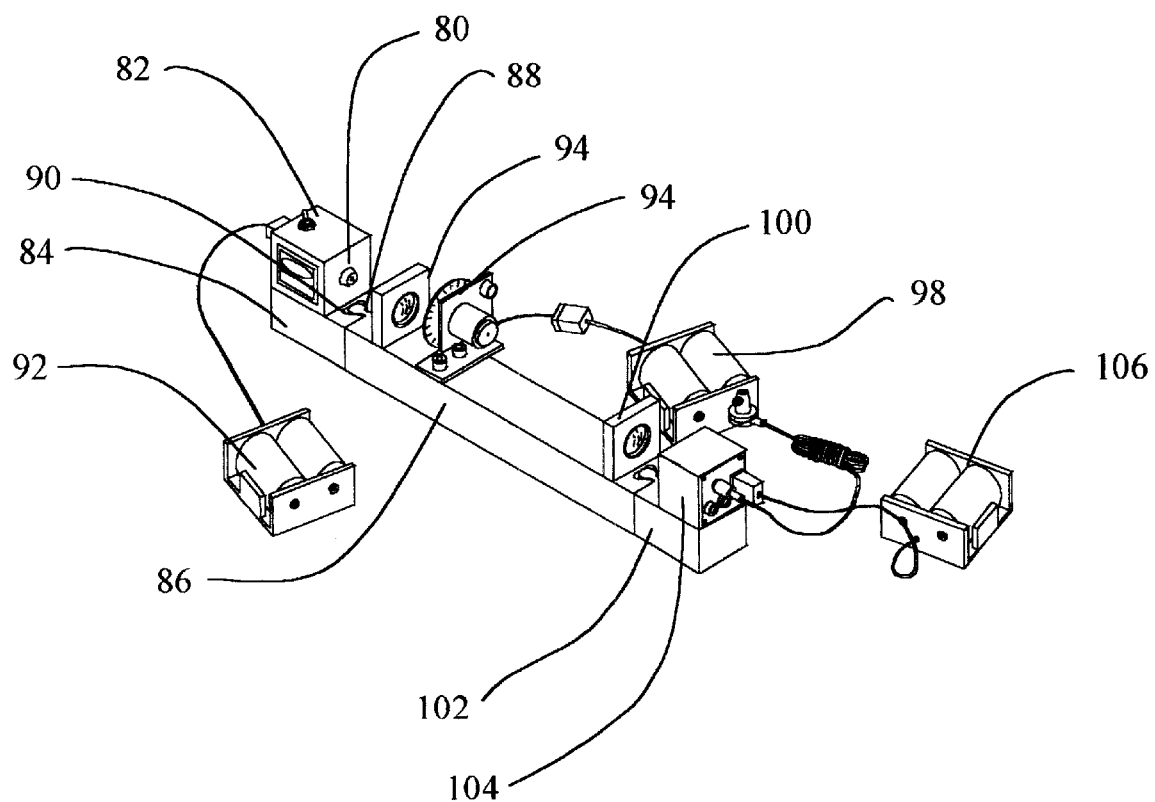
FIGS. 3A and 3B illustrate a third embodiment of the invention where the components are contained in linkable modules that mechanically fit together and can be assembled with various permutations to perform the optical demonstrations.
Figure 3B:
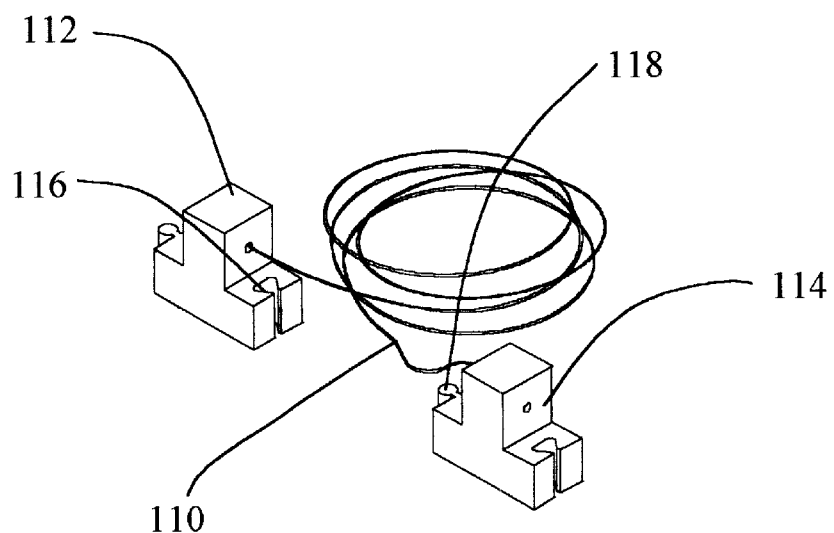

FIGS. 3A and 3B illustrate a third means embodying a learning system for teaching the principles of light, optics, and optical technology. In this case, the optical modules are mounted on separate base plates, which can be mechanically linked to other base plates (with affixed components), such that an optical train with pre-determined positions and alignments is produced. The order of the modules can be varied, and, as in the case of the rotating structures, a great variety of experiments are possible. The selectable nature of this embodiment is achieved by varying the identity of the modules, their sequence, and in some cases the direction of placement (e.g. telescopes can enlarge or reduce the size of an image depending on the direction of the light beam). In FIG. 3A, a laser diode 80 in housing 82 is attached onto base 84. Base 84 connects to base 86 through a linking mechanism. Base 86 includes an extending portion 88 which connects to a receiving portion 90 of base 84. Laser diode 80 is powered by battery pack 92. Base 86 includes a lens 94, a chopper 96 (powered by battery pack 98) and another lens 100. Base 86 is linked to base 102, which supports a detector 104 powered by battery pack 106. FIG. 3B illustrates a fiber optic supported by two mounts which include the same type of linking mechanism as found in FIG. 3A. In the figure, fiber optic 110 is terminated at each end. Bases 112 and 114 provide support for the fiber optic. The receiving portion 116 and the extending portion 118 can be seen in FIG. 3B.

There are at least four key advantages of the learning system that make this educational tool superior to other optics kits available. The learning system is easy to use. The learning system saves set-up time, because no parts need to be assembled or aligned. The means for positioning the modules renders the results more reproducible and the all-in-one design of optical-electronic modules offers more flexibility and breadth of experiments.

Accordingly, the optical learning system described herein provides advantages to educators as a consequence of their simplicity, flexibility, breadth of the invention. The essential feature is that the learning system is comprised of modules that link together into pre-determined locations. Each of the modules illustrate a principle of optics or optical technology, and more complex principles can be demonstrated by linking several of the modules together and transferring the light beam between them, by virtue of their proximity. Three illustrative embodiments are noted, including rotating wheels embedded with optics, sliding optical components, and connecting optical modules. As laser and optical technologies continue to become a bigger part of everyday lives, easy-to-use educational tools in the hands of teachers will help prepare students to be the next generation of technology workers.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. A learning system, comprising:
   a plurality of optical modules, wherein each optical module comprises at least one optical component wherein said each optical module comprises a rotating structure; and
   means for aligning an optical component from an optical module of said plurality of optical modules and an optical component from at least one other optical module of said plurality of optical modules onto a common optical axis, wherein said plurality of optically linked modules are operatively connected to operate as a system for teaching principles of optics.

2. The learning system of claim 1, wherein said each optical module of said plurality of modules comprises a plurality of optical components.

3. The learning system of claim 2, wherein said optical components are selected from a group consisting of a light-emitting component, a light-manipulating component and a light-detecting component.

4. The learning system of claim 1, wherein said at least one optical component is selected from a group consisting of a light bulb, a light emitting diode, a laser, a picture, a grating, a polarizer, an opening, a slit, a double slit, an aperture, a fiber optic, a light chopper, a scanning mirror, a birefringent crystal, a light modulator, a lens, a screen, an etalon, a speaker, a detector, an interferometer, a hologram and a device for demonstrating Snell's Law.

5. The learning system of claim 1, wherein said at least one optical component is selected from a group consisting of means for magnifying an image, means for diffracting light, means for polarizing light, means for measuring the separation between dispersed colors, means for interfering light, means for demonstrating Young's experiment, means for amplitude modulating light, means for demonstrating Snell's Law, means for reflecting light, means for demonstrating loss of light coherence, means for demonstrating birefringence, means for producing Airy spots, means for voice modulation and means for scrambling an image.

6. The learning system of claim 1, further comprising at least one additional plurality of optically linked modules, wherein said second plurality of optically linked modules is optically linked to said plurality of optically linked modules.

7. The learning system of claim 1, wherein said plurality of optically linked modules operate as a system for teaching principles of optics selected from a group consisting of light, lasers, light-manipulation and light-detection.

8. The learning system of claim 7, wherein said system is operatively and electrically connected to a computer to provide display and analysis of said principles.

9. A learning system, comprising:
   a base;
   an axel mounted to said base;
   a plurality of rotatable optically linked modules rotatably mounted on said axel and forming an optical train aligned to an optical axis, wherein each module of said plurality of rotatable optically linked modules comprises at least one optical component that is rotatable into said optical train to a pre-determined position, wherein said at least one optical component will be aligned to said optical axis when rotated into said optical train at said predetermined position, wherein said plurality of rotatable optically linked modules are operatively connected to operate as a system for teaching principles of optics.

10. The learning system of claim 9, wherein each module of said plurality of rotatable optically linked modules comprises a plurality of optical components, wherein each optical component of said plurality of optical components is rotatable into said optical train to said pre-determined position.

11. The learning system of claim 9, wherein said at least one optical components is selected from a group consisting of a light-emitting component, a light-manipulating component and a light-detecting component.

12. The learning system of claim 9, wherein said at least one optical component is selected from a group consisting of a light bulb, a light emitting diode, a laser, a picture, a grating, a polarizer, an opening, a slit, a double slit, an aperture, a fiber optic, a light chopper, a scanning mirror, a birefringent crystal, a light modulator, a lens, a screen, an etalon, a speaker, a detector, an interferometer, a hologram and a device for demonstrating Snell's Law.

13. The learning system of claim 9, wherein said at least one optical component is selected from a group consisting of means for magnifying an image, means for diffracting light, means for polarizing light, means for measuring the separation between dispersed colors, means for interfering light, means for demonstrating Young's experiment, means for amplitude modulating light, means for demonstrating Snell's Law, means for reflecting light, means for demonstrating loss of light coherence, means for demonstrating birefringence, means for producing Airy spots, means for voice modulation and means for scrambling an image.

14. The learning system of claim 9, further comprising means for optically linking said plurality of optically linked modules to at least one other plurality of optically linked modules.

15. The learning system of claim 9, wherein said system for teaching principles of optics are operatively connected for teaching principles of light, lasers, light-manipulation and light-detection.

16. The learning system of claim 15, wherein said system is operatively and electrically connected to a computer to provide display and analysis of said principles.

* * * * *

UNITED STATES PATENT AND TRADEMARK OFFICE
Certificate

Patent No. 6,382,982 B1                                                                                                     Patented: May 7, 2012

On petition requesting issuance of a certificate for correction of inventorship pursuant to 35 U.S.C. 256, it has been found that the above identified patent, through error and without any deceptive intent, improperly sets forth the inventorship.
   Accordingly, it is hereby certified that the correct inventorship of this patent is: J. David Fortenbery, Charlotte, NC (US); David Erceg, Concord, NC (US); and Aric Benedict, Monroe, NC (US).

Signed and Sealed this Sixteenth Day of October 2012.

<div style="text-align:right">

GENE CRAWFORD
*Supervisory Patent Examiner*
Art Unit 3651
Technology Center 3600

</div>

UNITED STATES PATENT AND TRADEMARK OFFICE
CERTIFICATE OF CORRECTION

PATENT NO.       : 6,382,982 B1
APPLICATION NO.  : 09/569161
DATED            : May 7, 2002
INVENTOR(S)      : Russell B. Wilcox et al.

Page 1 of 1

It is certified that error appears in the above-identified patent and that said Letters Patent is hereby corrected as shown below:

This certificate supersedes the Certificate of Correction issued October 16, 2012.
The certificate is vacated since no correction of inventorship was requested for
this patent number.

The correct inventorship of this patent is:

--Russell B. Wilcox, Ceritto, CA (US); Patricia C. Payne, Castro Valley, CA
(US); Steven T. Mills, Oakland, CA (US); Karen L. Jentes, San Jose, CA (US)--.

Signed and Sealed this
Twenty-seventh Day of November, 2012

David J. Kappos
*Director of the United States Patent and Trademark Office*